United States Patent
Ochello

(10) Patent No.: US 6,386,521 B1
(45) Date of Patent: May 14, 2002

(54) BASEMENT WATER INJECTION/ EVAPORATION SYSTEM

(75) Inventor: Charles Ochello, Lafayette, LA (US)

(73) Assignee: Columbia Energy Group, Herndon, VA (US)

( * ) Notice: Subject to any disclaimer, the term of this patent is extended or adjusted under 35 U.S.C. 154(b) by 0 days.

(21) Appl. No.: 09/545,012

(22) Filed: Apr. 7, 2000

(51) Int. Cl.⁷ .................................................. B01F 3/04
(52) U.S. Cl. ........................ 261/128; 261/5; 261/115; 261/141; 95/149; 95/227; 96/240
(58) Field of Search ............... 261/5, 115, 117, 261/118, 128, 142, 141; 96/240, 243; 95/149, 227, 228

(56) References Cited

U.S. PATENT DOCUMENTS

| | | | | | |
|---|---|---|---|---|---|
| 2,594,171 | A | * | 4/1952 | Howell | 261/115 |
| 3,327,455 | A | * | 6/1967 | Wertheimer | 261/115 |
| 3,353,335 | A | * | 11/1967 | Caballero | 261/115 |
| 3,494,099 | A | * | 2/1970 | Eng et al. | 261/115 |
| 3,841,063 | A | * | 10/1974 | Absher et al. | 261/5 |
| 4,158,702 | A | * | 6/1979 | Archer | 261/115 |
| 4,168,958 | A | * | 9/1979 | Hartman | 261/115 |
| 4,287,138 | A | * | 9/1981 | Buckner | 261/115 |
| 4,392,875 | A | * | 7/1983 | Celis | 96/240 |
| 4,959,084 | A | * | 9/1990 | Wolverton et al. | 96/240 |
| 5,145,498 | A | * | 9/1992 | Houston | 96/240 |

* cited by examiner

*Primary Examiner*—C. Scott Bushey
(74) *Attorney, Agent, or Firm*—Steptoe & Johnson PLLC

(57) ABSTRACT

A system and method for recycling basement water to cool hot gases released from an exhaust stack is disclosed having a storage tank for collecting and storing basement water, one or more spray nozzles attached to the interior of the exhaust stack, and one or more pumps and pipe lines for transporting the basement water from the storage tank to the spray nozzles attached to the interior of the exhaust stack, wherein upon injecting the basement water into the exhaust stack, the basement water is immediately evaporated by hot gases released from the exhaust stack. The basement water is transported using a transfer pump connected to the storage tank, an injection pump located near the exhaust stack, a first pipe line having a first diameter connecting the transfer pump to the injection pump, and a second pipe line having a second diameter connecting the injection pump to the spray nozzles located in the interior of the exhaust stack, wherein the first diameter of the first pipe line is larger than the second diameter of the second pipe line. In addition one or more filter elements are integrally connected to the second pipe line prior to the positioning of the spray nozzles to filter out contaminants in the basement water prior to it being injected into the interior of the exhaust stack.

29 Claims, 1 Drawing Sheet

BASEMENT WATER INJECTION/EVAPORATION SYSTEM

BACKGROUND OF THE INVENTION

1. Field of Technology

The present invention relates to cooling systems, and more particularly to a cooling system injecting basement water into an exhaust stack of a compressor or pumping station such that the evaporation of the basement water cools the hot gases released from the exhaust stack.

2. Related Art

Compressor facilities, power plants, manufacturing plants, and other large industrial sites typically all collect, store, and have to dispose of "basement" water which is the undesired water that accumulates in certain areas around the plant. For example, basement water may include rain water that infiltrates an engine room or pit, water originating from a cooling water system leak, or water used in cleaning an engine room, pit, or apparatus. This basement water is collected and transferred to a common collection facility. Because of these sources, basement water is typically dirty and almost always contains traces of oil, grease, glycol, and the like.

It is very difficult and expensive to dispose of basement water. In order to have on-site discharge, the waste basement water must be treated such that the resulting treated water is of a certain quality that satisfies the discharge levels set by state or federal governments. For example, on-site treatment may comprise using PHC degrading microorganisms to consume the oil and grease contained in the basement water.

When on-site discharge is not feasible, the basement water must be transported, or trucked, off-site and treated by a water treatment facility. Such off-site treatment is very expensive. For example, in 1991, all basement water generated at the Rayne Compression Facility in Louisiana was transported via 18-wheeler trucks in 6000 gallon lots to a disposal facility in Tennessee, costing an average of $6,000.00 per truckload of basement water.

Therefore, there is a need for an efficient and economical means for disposing of basement water that does not require treating the basement water until it satisfies government discharge levels nor require the transport, or trucking, of the basement water to a water treatment facility.

In addition to the constant accumulation of basement water that requires treatment, conventional compressor or pumping stations also employ numerous exhaust stacks as a means for discharging or releasing air, steam and/or other gases from the plant into the atmosphere. Typically, the released gases are of an extremely high temperature which require cooling before their release.

Therefore there is a need for an efficient and economical means for cooling the hot gases released from the exhaust stacks of the compressors.

SUMMARY OF THE INVENTION

The present invention solves the problems associated with managing basement water collected at a compressor station by employing a basement water injection/evaporation system. The system employs a series of pipe lines and pumps to transport basement water from a storage tank to an exhaust stack where an atomized spray of basement water is injected directly into the exhaust stack and immediately evaporated by the hot gases released from the exhaust stack.

Specifically, the means for injecting the basement water into the exhaust stack is one or more injector or spray nozzles positioned within the interior of the exhaust stack. The spray nozzles are preferably attached to the perimeter of the interior of the exhaust stack, but may alternatively be positioned, such as in the center of the exhaust stack. One or more high efficiency filter elements also are integrally connected to the pipe line prior to the spray nozzles. The filter elements remove any contaminants or debris from the basement water prior to it being injected into the interior of the exhaust stack.

In addition, the means for transporting the basement water from the storage tank to the means for injecting, e.g., the spray nozzles, includes a first pipe line connected to a transfer pump, wherein the transfer pump transfers, or pumps, the basement water from the storage tank into the first pipeline. The first pipeline is preferably PVC tubing and transports the basement water to an injection pump located near the exhaust stack. The injection pump transfers, or pumps, the basement water to a second pipeline. The second pipe line is preferably stainless steel tubing and transfers the basement water to the spray nozzles in the interior of the exhaust stack. Preferably, the second pipe line is routed alongside the exhaust stack and makes a vertical ascent prior to terminating at the spray nozzles. Any filters attached to the system are preferably attached on the vertical ascent portion of the second pipe line.

There are many advantages to implementing a system of the present invention with an exhaust stack of a power plant or compressor facility. First, the most obvious advantage is that the basement water is recycled thereby eliminating the need to haul it off of the premises for disposal. This saves time, money and additional emissions generated by the trucks used in hauling the basement water. In fact, annual cost savings at the Rayne Compressor Facility in Louisiana are about $30,000.00 (based on 7 to 9 truck loads per year).

Another advantage is that the released gases from the exhaust stack reach temperatures ranging from about 500 degrees to 800 degrees F. at the spray nozzles. Therefore, as the basement water is injected into the exhaust stack, the basement water is instantaneously evaporated. This eliminates the need for any additional gas-fired evaporator and eliminates any additional emissions that may have been generated by the installation of such an evaporator. The injection of water directly into the exhaust stack also results in some lowering of the temperature of the emissions.

In addition, this system utilizes all basement water that is collected and stored in a storage container. Therefore, almost all of the water used in washing the engine rooms and pits will be recycled resulting in a very efficient and economical system.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

Figure 1:
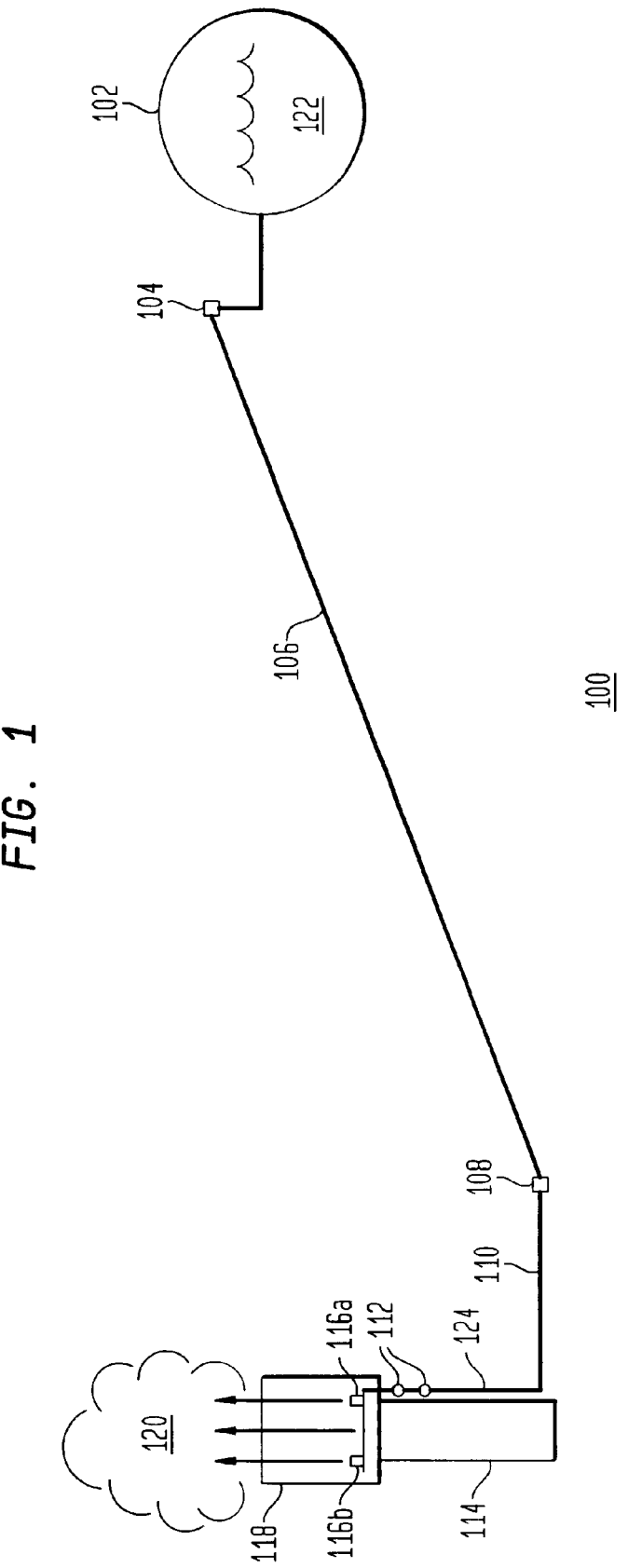
FIG. 1: A block diagram of a basement water injection/evaporation system for cooling an exhaust stack.

FIG. 1 shows a system 100 of the present invention for using basement water 122 contained in a storage tank 102 for cooling hot gases 120 released from an exhaust stack 118 of a compressor facility. In this system 100, the basement water 122, or waste water, collected at a compressor facility is stored in a storage tank 102 which preferably is a metal container having at least an about 8,800 gallon capacity. The basement water 122 is pumped from the storage tank 102 by a transfer pump 104. In the preferred embodiment, the transfer pump 104 is a commercially available, ½ horsepower, electric water transfer pump.

The transfer pump 104 transfers, or pumps, the basement water 122 from the storage tank 104 to an injection pump 108 via a first pipe line 106. In the preferred embodiment, the injection pump 108 is a commercially available 2000 psi, 5.0 electric, high pressure pump, e.g., A/R Landa Model No. PDE4-20021A single phase pump having a flow rate of about 3.5 gallons/minute, that is located near the exhaust stack 118. The first pipe line 106 is preferably 1½ inch PVC plastic pipe and has a length such that the first pipe line 106 connects the storage tank 102 with the injection pump 108. At the Rayne Compressor Facility, the first pipe line 106 is about 950 linear feet in length.

The injection pump 108 transfers, or pumps, the basement water 122 into a second pipe line 110 which terminates at a means for injecting the basement water into the exhaust stack 118. In the preferred embodiment, the preferred means for injecting comprises one or more spray nozzles 116*a,b* located within the interior of the exhaust stack 118. The second pipe line 110 is ⅜ inch stainless steel tubing which is required to withstand the high temperatures and pressure of the basement water 122 traveling through the system 100. The diameter of the second pipe line 110 tubing is smaller than the diameter of the first pipe line 106 tubing in order to achieve the pressure and velocity needed to inject the basement water 122 through the spray nozzles 116*a,b* such that the basement water 122 evaporates immediately upon contact with the hot gases 120. Also in the preferred embodiment, the second pipe line 110 is routed along side the exterior of the exhaust stack 118 wherein the second pipe line 110 has a vertical ascent 124 parallel to the exhaust stack 118. The use of a vertical ascent 124 in the second pipe line 110 is required due to the elevated height of the exhaust stack 118 over the building 114 housing the turbine compressor jets.

The second pipeline 110 terminates at two spray nozzles 116*a,b* which are preferably positioned along the perimeter of the interior of the exhaust stack 118. In an alternative embodiment, the spray nozzles 116*a,b* may be positioned in the center of the exhaust stack 118. Also in the preferred embodiment, the spray nozzles 116*a,b* are commercially available No. 6 nozzles, having about 0.057 inch diameter openings in the filter heads, that inject and atomize the basement water 122 into the exhaust stack 118 for instant evaporation while at the same time allowing for an about 3½ gallon/minute flow capacity. The spray nozzles 116*a,b* are welded or soldered onto the second pipe line 110 using conventional methods as a means for securing the spray nozzles 116*a,b* and ensuring that the spray nozzles 116*a,b* will not drop off during operation.

The present invention is described in terms of two spray nozzles 116*a,b* for convenience purpose only. It would be readily apparent to one of ordinary skill in the relevant art to use a different number of spray nozzles 116*a,b* in a system 100 of the present invention. In addition, the size of the spray nozzles 116*a,b* used depends on the amount of sediment in the basement water 122. For example, if the basement water 122 contains a lot of sediment or sediment having large particle sizes, then the size of the spray nozzles 116*a,b* used in the system 100 must be increased.

The system 100 of the present invention also comprises one or more filter elements 112 that are preferably integrated into the second pipe line 110 along the vertical ascent 124. The preferred filter elements 112 are high efficiency TM filter canisters that provide the necessary filtration of any fine particles that could possibly clog the spray nozzles 116*a,b*, e.g., having at least about a 100 micron filter element. If the number of contaminants increases, a 200–500 micron filter element 112 may be used. In addition, the filter elements 112 are positioned along the vertical ascent 124 of the second pipe line 110 for convenience purpose only. It would be readily apparent to one of ordinary skill in the art to position the filter elements 112 at any position along the first pipe line 106 or second pipe line 110, as long as the basement water 122 is filtered prior to being injected into the interior of the exhaust stack 118.

In the present invention, the transfer pump 104, first pipe line 106, injection pump 108, and second pipe line 110 comprise a means for transporting the basement water 122 from the storage tank 102 to the means for injecting the basement water 122 into the exhaust stack 118, e.g., the spray nozzles 116*a,b*. This preferred means for transporting the basement water 122 also is for convenience only. It would be readily apparent to one of ordinary skill in the relevant art to design and implement a comparable means for transporting basement water 122 from a storage tank 102 to the means for injecting.

If the system 100 of the present invention is to be used in cold weather, the system 100 will have to be heated or insulated to prevent the first pipe line 106, second pipe line 110, and/or the spray nozzles 116*a,b* from freezing. Specifically, the first pipeline 106 and the second pipe line 110 may be insulated according to conventional means, e.g., wrapping the first pipe line 106 and the second pipe line 110 in thermal insulation padding. Alternatively, a conventional agitator or heater can be incorporated into the storage tank 102 as a means for keeping the basement water 122 from freezing and for moving the basement water 122 through the system 100.

In operation, basement water 122 is collected and stored in the storage tank 102. Then, when desired, the transfer pump 104 and the injection pump 108 are started, wherein the transfer pump 104 pumps the basement water 122 from the storage tank 102 into a first pipe line 106. The first pipe line 106 transports the basement water 122 to the injection pump 108, wherein the injection pump 108 pumps the basement water 122 into a second pipe line 110. At the end of the second pipe line 110, the basement water 122 is injected into the interior of the exhaust stack 118 through the spray nozzles 116*a,b*. Preferably, the basement water 122 is filtered prior to it being injected into the exhaust stack 118 by one or more filter elements 112 connected to the second pipe line 110. Immediately upon being injected into the exhaust stack 118, the basement water 122 is evaporated.

Current testing of the system 100 shows that a volume of 3,000,000 gallons of basement water 122 can be evaporated before effecting the emissions of a single exhaust stack 118. However, the anticipated volume to be evaporated should not exceed 1,000,000 gallons in a single year.

All dimensions, materials, and commercially available components used in the preferred embodiment are for convenience purpose only. It would be readily apparent to one of ordinary skill in the relevant arts to design and build a comparable system 100 of the present invention using different dimensions and comparable materials and components. Furthermore, the present invention is described in terms of a compressor facility also for convenience purpose only. It would be readily apparent to one of ordinary skill in the relevant art to use the basement water injection/evaporation system of the present invention in any facility, e.g. power plant, manufacturing plant, etc., collecting basement water and having one or more exhaust stacks for releasing hot gases.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments, but should be defined in accordance with the specification and any equivalents.

What is claimed is:

1. A system for recycling basement water to cool hot gases released from an exhaust stack, comprising:
   a storage tank for collecting and storing basement water;
   a means for injecting the basement water into the interior of the exhaust stack; and
   a means for transporting the basement water from said storage tank to said means for injecting the basement water into the interior of the exhaust stack;
   wherein upon injecting the basement water into the interior of the exhaust stack, the basement water is immediately evaporated by hot gases released from the exhaust stack.

2. The system according to claim 1, wherein said means for injecting the basement water into the interior of the exhaust stack comprises one or more spray nozzles positioned within the interior of the exhaust stack.

3. The system according to claim 2, wherein said spray nozzles are positioned along the perimeter of the interior of the exhaust stack.

4. The system according to claim 2, wherein said spray nozzles are positioned in the center of the interior of the exhaust stack.

5. The system according to claim 2, wherein each said spray nozzle has a filter head with a plurality of openings about 0.057 inches in diameter.

6. The system according to claim 2, further comprising one or more filter elements integrally connected to said means for transporting the basement water wherein each said filter element is a mechanical filter element and is positioned prior to and in proximity to said means for injecting the basement water into the interior of the exhaust stack.

7. The system according to claim 6, wherein said one or more filter elements is a high efficiency filter cannister with at least about a 100 micron filter element.

8. The system according to claim 1, wherein said means for transporting the basement water from said storage tank to said means for injecting the basement water into the interior of the exhaust stack comprises:
   a transfer pump connected to said storage tank;
   an injection pump;
   a first pipe line having a first diameter connecting said transfer pump to said injection pump; and
   a second pipe line having a second diameter connecting said injection pump to said means for injecting the basement water into the interior of the exhaust stack.

9. The system according to claim 8, wherein said first pipe line is about 1½ inch diameter plastic pipe.

10. The system according to claim 8, wherein said second pipe line is about ⅜ of an inch diameter stainless steel tubing.

11. The system according to claim 8, wherein said first diameter of said first pipe line is larger than said second diameter of said second pipe line.

12. The system according to claim 8, wherein said second pipe line comprises a vertical ascent paralleling the exhaust stack.

13. The system according to claim 12, wherein said means for injecting the basement water into the interior of the exhaust stack comprises one or more spray nozzles positioned within the interior of the exhaust stack.

14. The system according to claim 13, further comprising one or more filter elements integrally connected to said vertical ascent of said second pipe line and prior to said one or more spray nozzles, wherein each said filter element is a mechanical filter.

15. The system according to claim 1, wherein said storage tank comprises a means for preventing the basement water from freezing.

16. The system according to claim 15, wherein said means for preventing the basement water from freezing is an agitator.

17. The system according to claim 15, wherein said means for preventing the basement water from freezing is a heater.

18. The system according to claim 8, wherein said first pipe line and said second pipe line are insulated.

19. A method for disposing of basement water and cooling hot gases released from an exhaust stack, comprising the steps of:
   a. pumping basement water from a storage tank;
   b. transporting the basement water from said storage tank to an exhaust stack; and
   c. injecting the basement water into the interior of the exhaust stack, wherein the basement water is immediately evaporated by hot gases released from the exhaust stack.

20. The method according to claim 19, further comprising:
   d. filtering the basement water prior to said step (c) with one or more filter elements wherein each said filter element is a mechanical filter element and is positioned prior to and in proximity to said injecting of the basement water into the interior of the exhaust stack of said step (c).

21. The method according to claim 19, wherein in said step (b), the basement water is transported through a first pipe line having a first diameter.

22. The method according to claim 21, wherein in said step (b), the basement water is further transported through a second pipe line, having a second diameter, using an injection pump.

23. The method according to claim 22, wherein the first diameter of the first pipe line is larger than the second diameter of the second pipe line.

24. The method according to claim 19, wherein in said step (c) the basement water is injected through one or more spray nozzles positioned within the interior of the exhaust stack.

25. The method according to claim 24, wherein said spray nozzles are positioned along the perimeter of the interior of the exhaust stack.

26. The method according to claim 24, wherein said spray nozzles are positioned in the center of the interior of the exhaust stack.

27. The method according to claim 19, further comprising:
   d. insulating the basement water as it is transported in said step (b).

28. The method according to claim 19, further comprising:
   d. agitating the basement water in the storage tank.

29. The method according to claim 19, further comprising:
   d. heating the basement water in the storage tank.

* * * * *